(12) United States Patent
Sakata et al.

(10) Patent No.: US 10,253,114 B2
(45) Date of Patent: Apr. 9, 2019

(54) POLYOLEFIN MODIFIED WITH NITROGEN-CONTAINING HETEROCYCLIC COMPOUND, AND ADHESIVE COMPOSITION CONTAINING SAME

(71) Applicant: TOYOBO CO., LTD., Osaka (JP)

(72) Inventors: Hideyuki Sakata, Hyogo (JP); Kenji Kashihara, Hyogo (JP)

(73) Assignee: TOYOBO CO., LTD., Osaka (JP)

( * ) Notice: Subject to any disclaimer, the term of this patent is extended or adjusted under 35 U.S.C. 154(b) by 560 days.

(21) Appl. No.: 14/891,388

(22) PCT Filed: May 8, 2014

(86) PCT No.: PCT/JP2014/062338
§ 371 (c)(1),
(2) Date: Nov. 16, 2015

(87) PCT Pub. No.: WO2014/185332
PCT Pub. Date: Nov. 20, 2014

(65) Prior Publication Data
US 2016/0130373 A1 May 12, 2016

(30) Foreign Application Priority Data

May 17, 2013 (JP) .................................. 2013-105032
May 17, 2013 (JP) .................................. 2013-105033

(51) Int. Cl.
| | |
|---|---|
| C08F 8/30 | (2006.01) |
| B32B 27/32 | (2006.01) |
| C09J 123/36 | (2006.01) |
| C08F 255/02 | (2006.01) |
| C08F 255/04 | (2006.01) |
| C08F 8/32 | (2006.01) |
| C09J 151/06 | (2006.01) |
| B32B 7/12 | (2006.01) |
| B32B 17/06 | (2006.01) |
| C08F 8/46 | (2006.01) |

(52) U.S. Cl.
CPC .................. *C08F 8/30* (2013.01); *B32B 7/12* (2013.01); *B32B 17/064* (2013.01); *B32B 27/32* (2013.01); *C08F 8/32* (2013.01); *C08F 255/02* (2013.01); *C08F 255/04* (2013.01); *C09J 123/36* (2013.01); *C09J 151/06* (2013.01)

(58) Field of Classification Search
CPC .. C08F 8/30; C08F 8/32; C08F 255/02; C08F 255/04; C08F 8/46; C09J 123/16; C09J 123/36

USPC .............. 525/375, 386; 524/379, 530, 531; 428/355 CN
See application file for complete search history.

(56) References Cited

U.S. PATENT DOCUMENTS

| | | | |
|---|---|---|---|
| 4,520,171 A | 5/1985 | Diveley et al. | |
| 5,188,745 A | 2/1993 | Migdal et al. | |
| 5,378,746 A | 1/1995 | Beyrle et al. | |
| 6,465,558 B2 * | 10/2002 | Scheibelhoffer | ........... C09J 5/00 524/315 |
| 2006/0199917 A1 | 9/2006 | Chino | |
| 2008/0221272 A1 | 9/2008 | Tournhilhac et al. | |
| 2011/0135859 A1 | 6/2011 | Tournhilhac et al. | |

FOREIGN PATENT DOCUMENTS

| | | |
|---|---|---|
| EP | 0 549 196 | 6/1993 |
| EP | 1 712 604 | 10/2006 |
| JP | 43-16395 | 7/1943 |
| JP | 58-120608 | 7/1983 |
| JP | 61-276801 | 12/1986 |
| JP | 7-504925 | 6/1995 |
| JP | 11-501069 | 1/1999 |
| JP | 3142985 | 12/2000 |
| JP | 2002-533479 | 10/2002 |
| JP | 2004-195717 | 7/2004 |
| JP | 2005-68210 | 3/2005 |
| JP | 2008-505998 | 2/2008 |
| JP | 2010-179867 | 8/2010 |
| WO | 93/12148 | 6/1993 |
| WO | 96/27622 | 9/1996 |
| WO | 00/37449 | 6/2000 |
| WO | 2005/044869 | 5/2005 |

OTHER PUBLICATIONS

International Search Report dated Jul. 15, 2014 in International (PCT) Application No. PCT/JP2014/062338.
Extended European Search Report dated Jan. 2, 2017 in corresponding European patent application No. 14 79 8159.
Database CA [Online] Chemical Abstracts Service, Columbus, Ohio, US; May 12, 1984 (May 12, 1984), "Polyolefin modified with an unsaturated carboxylic acid and a piperidine derivative", XP002765159.

* cited by examiner

*Primary Examiner* — Fred M Teskin
(74) *Attorney, Agent, or Firm* — Wenderoth, Lind & Ponack, L.L.P.

(57) ABSTRACT

This invention provides a novel polyolefin modified with a nitrogen-containing heterocyclic compound containing no harmful halogen atoms such as chlorine, and an adhesive composition between a polyolefin substrate and an inorganic substrate such as a glass substrate. A polyolefin modified with a nitrogen-containing heterocyclic compound (C) having a nitrogen-containing heterocyclic compound (B) at the side chain of an acid-modified polyolefin (A).

14 Claims, No Drawings

POLYOLEFIN MODIFIED WITH NITROGEN-CONTAINING HETEROCYCLIC COMPOUND, AND ADHESIVE COMPOSITION CONTAINING SAME

TECHNICAL FIELD

The present invention relates to a novel polyolefin modified with a nitrogen-containing heterocyclic compound, to an adhesive composition using the polyolefin, and in particular to an adhesive composition suitable for adhering a polyolefin substrate to an inorganic substrate.

BACKGROUND ART

A glass plate for automobile windows integrally includes a polyolefin molding that is placed between the glass plate and an automobile body, seals between the glass plate and the automobile body, and, if necessary, has a decorative function or the like. Although the adhesion between an inorganic substrate such as a glass plate and a polyolefin molding is required, unmodified polyolefin is a chemically inactive material with extremely poor adhesion because it does not include a polar group in its molecule.

Patent Literature 1 suggests a method for adhering a polyolefin elastomer and a glass substrate using a chlorinated polyolefin and a silane coupling agent as adhesive components (Patent Literature 1). However, in this method, the adhesion laminate of the thermoplastic elastomer and the glass substrate contains halogen, and environmental problems that occur during incineration are not completely solved.

Patent Literature 2 suggests an adhesive capable of adhering a polyolefin elastomer and a glass substrate without containing a halogen by the combined use of a maleic-anhydride-modified polyolefin, and a silane coupling agent containing an epoxy group or amino group. However, the addition of the silane coupling agent beforehand deteriorates storage stability, and thus, the silane coupling agent must be separately added during the application of the adhesive. Equipment such as a stirrer is also required for attaining sufficient homogeneity, which requires complicated steps.

Further, although Patent Literature 3 suggests a method in which a maleic-anhydride-modified polyolefin is used as an adhesive without separately adding a silane coupling agent, etc., the adhesion strength of the adhesive is insufficient.

CITATION LIST

Patent Literature

PTL 1: JP3142985B
PTL 2: JP2010-179867A
PTL 3: JP2004-195717A

SUMMARY OF INVENTION

Technical Problem

The present invention was accomplished based on the above and uses a novel modified polyolefin containing no halogen atoms. An object of the invention is to provide a one-component liquid adhesive composition having excellent adhesion between a polyolefin substrate and a glass substrate, adhesion after the moisture resistance test, and excellent storage stability even when a silane coupling agent or the like is not separately added.

Solution to Problem

To attain the above object, the present inventors conducted extensive research and arrived at the following invention. Specifically, the present invention relates to a polyolefin modified with a nitrogen-containing heterocyclic compound that is at the side chain of an acid-modified polyolefin shown below, and to an adhesive composition using the polyolefin.

A polyolefin modified with a nitrogen-containing heterocyclic compound (C) having a nitrogen-containing heterocyclic compound (B) at a side chain of an acid-modified polyolefin (A).

The nitrogen-containing heterocyclic compound (B) is preferably a cyclic alkylene urea derivative.

The nitrogen-containing heterocyclic compound (B) is also preferably an imidazolidinone derivative and/or a tetrahydropyrimidinone derivative represented by formula (1) below, $$\underset{HN}{\overset{O}{\bigg\|}} \underset{[\ ]_n}{\bigg\langle} N\text{-}A\text{-}R$$

wherein n is an integer of 1 or 2, A is a $C_{1\text{-}20}$ alkylene group that may have at least one substituent, and R is an amino group, a hydroxy group, a thiol group, an isocyanate group, or an epoxy group.

The nitrogen-containing heterocyclic compound (B) is preferably 1-(2-aminoethyl)-2-imidazolidinone.

The amount of the nitrogen-containing heterocyclic compound (B) is preferably 0.4 to 7 mass %.

The acid-modified polyolefin (A) is preferably a maleic-anhydride-modified polypropylene and/or a maleic-anhydride-modified propylene α-olefin copolymer.

A composition of a polyolefin composition that is modified with a nitrogen-containing heterocyclic compound and contains the polyolefin modified with a nitrogen-containing heterocyclic compound (C) and an organic solvent (D).

The organic solvent (D) is a mixture of a solvent (D1) and a solvent (D2). The solvent (D1) is at least one solvent selected from the group consisting of aromatic hydrocarbons, aliphatic hydrocarbons, alicyclic hydrocarbons, and halogenated hydrocarbons. The solvent (D2) is at least one solvent selected from the group consisting of alcohol-based solvents, ketone-based solvents, and ester-based solvents. The ratio of solvent (D1)/solvent (D2) is preferably 60 to 95/40 to 5 (mass ratio).

The organic solvent (D) is preferably contained in an amount of 100 to 1,000 parts by mass per 100 parts by mass of the polyolefin modified with a nitrogen-containing heterocyclic compound (C).

An adhesive composition comprising the polyolefin modified with a nitrogen-containing heterocyclic compound (C) or the composition of the polyolefin modified with a nitrogen-containing heterocyclic compound according to any one of the above paragraphs.

A laminate wherein a polyolefin substrate is adhered to an inorganic substrate by the adhesive composition according to any one of the above paragraphs.

Advantageous Effects of Invention

The polyolefin modified with a nitrogen-containing heterocyclic compound of the present invention is a novel modified polyolefin containing no harmful halogen atoms such as chlorine. Since an adhesive composition contains the polyolefin modified with a nitrogen-containing heterocyclic compound, it exhibits high adhesion between a polyolefin substrate and an inorganic substrate such as a glass substrate, and high adhesion after moisture resistance test, without using a silane coupling agent.

DESCRIPTION OF EMBODIMENTS

An embodiment of the present invention is detailed below.
Acid-Modified Polyolefin (A)

Although the acid-modified polyolefin (A) used in the present invention is not limited, it is preferably obtained by grafting at least one member selected from the group consisting of α,β-unsaturated carboxylic acids and the acid anhydrides thereof on at least one member selected from polypropylenes and propylene α-olefin copolymers.

The propylene α-olefin copolymer is obtained by copolymerizing α-olefin on predominant propylene. Examples of the α-olefin include ethylene, 1-butene, 1-heptene, 1-octene, 4-methyl-1-pentene, and the like. These α-olefins can be used singly or in combination. Of these α-olefins, ethylene and 1-butene are preferable. Although the ratio of the propylene component and the α-olefin component in the propylene α-olefin copolymer is not limited, the propylene component is preferably 50 mol % or more, and more preferably 70 mol % or more.

Examples of the at least one member selected from α,β-unsaturated carboxylic acids and acid anhydrides thereof include maleic acid, itaconic acid, citraconic acid, and acid anhydrides thereof. Of these, acid anhydrides are preferable, and maleic anhydrides are more preferable. Specific examples include maleic-anhydride-modified polypropylene, maleic-anhydride-modified propylene-ethylene copolymers, maleic-anhydride-modified propylene-butene copolymers, maleic-anhydride-modified propylene-ethylene-butene copolymers, etc. These acid-modified polyolefins can be used singly or in a combination of two or more.

From the viewpoint of adhesion between the polyolefin substrate and the inorganic substrate such as a glass substrate, the acid modification amount is preferably 0.3 mass % or more, more preferably 0.5 mass % or more, even more preferably 0.8 mass % or more, particularly preferably 1.1 mass % or more, and most preferably 1.5 mass % or more. The acid modification amount is also preferably 5.5 mass % or less, more preferably 5 mass % or less, even more preferably 4.5 mass % or less, particularly preferably 4 mass % or less, and most preferably 3.5 mass % or less. Since the modification amount of the nitrogen-containing heterocyclic compound (B) depends on the acid modification amount, when the acid modification amount is less than 0.3 mass %, the nitrogen-containing heterocyclic compound (B) may not be fully added, and when the acid modification amount exceeds 5.5 mass %, the stability of the acid-modified polyolefin (A) may be impaired.

The method for producing the acid-modified polyolefin (A) is not particularly limited. Examples of the method include a radical graft reaction (specifically, a reaction in which a radical is generated on the main chain polymer, and the unsaturated carboxylic acid and the acid anhydride are graft-polymerized using the radical as a polymerization starting point.)

Examples of the organic peroxide used as a radical-generating agent include di-tert-butylperoxy phthalate, tert-butyl hydroperoxide, dicumyl peroxide, benzoyl peroxide, tert-butylperoxy benzoate, tert-butylperoxy-2-ethylhexanoate, tert-butylperoxypivalate, methyl ethyl ketone peroxide, di-tert-butyl peroxide, lauroyl peroxide, and like peroxides; and azobisisobutyronitrile, azobis isopropionitrile, and like azonitriles.

Since the acid anhydride group of the acid-modified polyolefin (A) absorbs moisture in air or in a solvent and thus easily cause ring opening, it often changes to a dicarboxyl group over time. Accordingly, for the reaction of the acid-modified polyolefin (A) with the nitrogen-containing heterocyclic compound (B), if necessary, the acid-modified polyolefin (A) is preferably dehydrated by heating to change the dicarboxyl group to the acid anhydride group.
Nitrogen-Containing Heterocyclic Compound (B)

Although the nitrogen-containing heterocyclic compound (B) used in the present invention is not particularly limited, it is preferably a cyclic alkylene urea derivative. The nitrogen-containing heterocyclic compound (B) is more preferably a 5- or 6-membered ring compound containing a nitrogen atom in the ring. The nitrogen atom contained in the ring is preferably a secondary amine. Adhesion, including moisture resistant adhesion, between the polyolefin substrate and the inorganic substrate, such as a glass substrate, can be improved via a hydrogen linkage of secondary amine. The nitrogen-containing heterocyclic compound (B) is even more preferably an imidazolidinone derivative and/or a tetrahydro pyrimidinone derivative represented by formula (1),

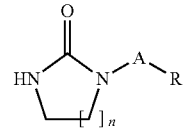

wherein n is an integer of 1 or 2, A is an alkylene group that may have at least one substituent, and the carbon number of the alkylene group is preferably 1 or more, more preferably 2 or more, and preferably 20 or less, more preferably 10 or less, even more preferably 8 or less, and particularly preferably 5 or less. The substituent of A is hydrogen or $C_{1-5}$ alkyl group that may have a branch. R is an amino group, a hydroxy group, a thiol group, an isocyanate group, or an epoxy group. Because of good reactivity with an acid anhydride group, R is more preferably an amino group or a hydroxy group, and even more preferably a primary amine or a secondary amine.

Specific examples of the nitrogen-containing heterocyclic compound (B) include 1-(1-aminomethyl)-2-imidazolidinone, 1-(2-aminoethyl)-2-imidazolidinone, 1-(3-amino-n-propyl)-2-imidazolidinone, 1-(4-amino-n-butyl)-2-imidazolidinone, 1-(1-aminomethyl)-tetrahydro-2-pyrimidinone, 1-(2-aminoethyl)-tetrahydro-2-pyrimidinone, 1-(3-amino-n-propyl)-tetrahydro-2-pyrimidinone, 1-(4-amino-n-butyl)-tetrahydro-2-pyrimidinone, and like amine derivatives; 1-(1-hydroxymethyl)-2-imidazolidinone, 1-(2-hydroxyethyl)-2-imidazolidinone, 1-(3-hydroxy-n-propyl)-2-imidazolidinone, 1-(4-hydroxy-n-butyl)-2-imidazolidinone, 1-(1-hydroxymethyl)-tetrahydro-2-pyrimidinone, 1-(2-hydroxyethyl)-tetrahydro-2-pyrimidinone, 1-(3-hydroxy-n-propyl)-tetrahydro-2-pyrimidinone, 1-(4-hydroxy-n-butyl)-tetrahydro-2-pyrimidinone, and like hydroxy group derivatives; 1-(1-mercaptomethyl)-2-imidazolidinone, 1-(2-mercaptoethyl)-2-imidazolidinone, 1-(3-mercapto-n-propyl)-2-imidazolidinone, 1-(4-mercapto-n-butyl)-2-imidazolidinone, 1-(1-mercaptomethyl)-tetrahydro-2-pyrimidinone, 1-(2-mercaptoethyl)-tetrahydro-2-pyrimidinone, 1-(3-mercapto-n-propyl)-tetrahydro-2-pyrimidinone, 1-(4-mercapto-n-butyl)-tetrahydro-2-pyrimidinone, and like thiol derivatives; 1-(1-isocyanate methyl)-2-imidazolidinone, 1-(2-isocyanate ethyl)-2-imidazolidinone, 1-(3-isocyanate-n-propyl)-2-imidazolidinone, 1-(4-isocyanate-n-butyl)-2-imidazolidinone, 1-(1-isocyanate methyl)-tetrahydro-2-pyrimidinone, 1-(2-isocyanate ethyl)-tetrahydro-2-pyrimidinone, 1-(3-isocyanate-n-propyl)-tetrahydro-2-pyrimidinone, 1-(4-isocyanate-n-butyl)-tetrahydro-2-pyrimidinone, and like isocyanate derivatives; 1-(1-epoxy methyl)-2-imidazolidinone, 1-(2-epoxy ethyl)-2-imidazolidinone, 1-(3-epoxy-n-propyl)-2-imidazolidinone, 1-(4-epoxy-n-butyl)-2-imidazolidinone, 1-(1-epoxy methyl)-tetrahydro-2-pyrimidinone, 1-(2-epoxy ethyl)-tetrahydro-2-pyrimidinone, 1-(3-epoxy-n-propyl)-tetrahydro-2-pyrimidinone, 1-(4-epoxy-n-butyl)-tetrahydro-2-pyrimidinone, and like epoxy derivatives; and the like. However, the nitrogen-containing heterocyclic compound (B) is not limited these. Of them, 1-(2-aminoethyl)-2-imidazolidinone and 1-(2-hydroxyethyl)-2-imidazolidinone are preferable from the viewpoint of availability.

Polyolefin Modified with Nitrogen-Containing Heterocyclic Compound (C)

The polyolefin modified with a nitrogen-containing heterocyclic compound (C) of the present invention is a modified polyolefin having the nitrogen-containing heterocyclic compound (B) at the side chain of the acid-modified polyolefin (A). A preferable embodiment is a polyolefin modified by grafting the acid-modified polyolefin (A) on the nitrogen-containing heterocyclic compound (B). Specifically, an embodiment modified by grafting the acid anhydride group of the acid-modified polyolefin (A) on the functional group (an amino group, a hydroxy group, a thiol group, an isocyanate group, or an epoxy group) of the nitrogen-containing heterocyclic compound (B) via a chemical bond is preferable. The following explains the case where the nitrogen-containing heterocyclic compound (B) is 1-(2-aminoethyl)-2-imidazolidinone as an example of the chemical bond. The amino group (the amino group portion of the aminoethyl group) of 1-(2-aminoethyl)-2-imidazolidinone and the anhydride group of the acid-modified polyolefin (A) undergo a ring-opening reaction to form an amide linkage with a carboxylic acid, thus forming a chemical bond. Specifically, the acid-modified polyolefin (A) and the imidazolidinone ring are bound via the amide linkage and the ethylene group, and the NH group at position 3 of the imidazolidinone ring is apparently not chemically reacted.

It is thought that by introducing the nitrogen-containing heterocyclic compound (B) into the acid-modified polyolefin (A), interaction originating from a hydrogen linkage occurs between the inorganic substrate such as a glass substrate and a proton (NH group at position 3 of the imidazolidinone ring in the previous example) in the nitrogen-containing heterocyclic compound (B), which enables attaining high adhesion. Further, by adhering the acid-modified polyolefin (A) residue in the nitrogen-containing heterocyclic compound (C) to a polyolefin substrate, the inorganic substrate and the polyolefin substrate consequently have a high level of adhesion. In contrast, since the alkylene group A, etc., that binds the acid-modified polyolefin (A) and the nitrogen-containing heterocyclic compound (B) has a large polar difference from the nitrogen-containing heterocyclic compound (B), the chain length of the alkylene group A, etc., is unlikely to have a significant effect on the interaction (adhesion).

The amount of the nitrogen-containing heterocyclic compound (B) is preferably 0.4 mass % or more, more preferably 0.6 mass % or more, even more preferably 1 mass % or more, particularly preferably 1.5 mass % or more, and most preferably 2 mass % or more. Although the upper limit of the amount of the nitrogen-containing heterocyclic compound (B) is not particularly limited, it is preferably 7 mass % or less, more preferably 6.5 mass % or less, even more preferably 6 mass % or less, particularly preferably 5.5 mass % or less, and most preferably 5 mass % or less considering the acid modification of the acid-modified polyolefin (A). When the amount of the nitrogen-containing heterocyclic compound (B) is less than 0.4 mass %, interaction between the inorganic substrate and the polyolefin substrate does not occur, sometimes failing to exhibit high adhesion. In contrast, when the amount of the nitrogen-containing heterocyclic compound (B) exceeds 7 mass %, the adhesion effect is sometimes saturated.

The presence or absence of modification of the nitrogen-containing heterocyclic compound (B) in the present invention is verified based on the following points: the absorption peak at 1780 cm$^{-1}$, which is specific to an acid anhydride group, is not observed by FT-IR in the polyolefin modified with a nitrogen-containing heterocyclic compound (C); and the absorption peaks at 1640 cm$^{-1}$ and 1720 cm$^{-1}$, which are in the zone relating to the C=O double bond specific to nitrogen-containing heterocyclic compounds (imidazolidinone derivative, tetrahydro pyrimidinone derivative, amide, or the like) are observed. The amount of the nitrogen-containing heterocyclic compound (B) depends on the acid modification amount of the acid-modified polyolefin (A), and is calculated as follows: (acid modification amount of the acid-modified polyolefin (A)/the molecular amount of acid and/or acid anhydride used for the acid modification polyolefin (A))×(the molecular amount of the nitrogen-containing heterocyclic compound (B)).

The weight average molecular weight (Mw) of the polyolefin modified with a nitrogen-containing heterocyclic compound (C) is preferably 5,000 to 200,000, more preferably 10,000 to 150,000, and even more preferably 30,000 to 120,000. When the amount is less than 5,000, cohesive force may become weak, sometimes resulting in poor adhesion. When the amount exceeds 200,000, fluidity becomes poor, sometimes causing problems in operability during adhesion.

Mw in the present invention is a value measured by the gel permeation chromatography ("GPC"; standard substance: polystyrene resin).

The method for producing the polyolefin modified with a nitrogen-containing heterocyclic compound (C) is not particularly limited. The polyolefin modified with a nitrogen-containing heterocyclic compound (C) can be obtained, for example, by conducting heating reaction in a solvent (good solvent) that dissolves or disperses the acid-modified polyolefin (A) and the nitrogen-containing heterocyclic compound (B). Although the reaction temperature is suitably determined depending on reaction reagents or solvent species of the nitrogen-containing heterocyclic compound, etc., it is preferably 50° C. or more, more preferably 60° C. or more, and even more preferably 70° C. or more. Although the upper reaction temperature limit is not particularly limited, it is a reflux temperature or about 100° C. To isolate the polyolefin modified with a nitrogen-containing heterocyclic compound (C), the reaction solvent may be, for example, distilled off by concentration, or a solvent that does not dissolve the nitrogen-containing heterocyclic compound (C) ("poor solvent") may be introduced, and solid-liquid separation may be performed after precipitation.

Examples of the good solvent are not particularly limited. Usable examples include aromatic hydrocarbons such as benzene, toluene, and xylene; aliphatic hydrocarbons such as hexane, heptane, octane, and deccan; alicyclic hydrocarbons such as cyclohexane, cyclohexene, methylcyclohexane, and ethylcyclohexane; alcohol-based solvents such as methanol, ethanol, isopropyl alcohol, butanol, pentanol, hexanol, propanediol, and phenol; ketone-based solvents such as acetone, methyl isobutyl ketone, methyl ethyl ketone pentanone, hexanone, cyclohexanone, isophorone, and acetophenone; cellosolves such as methyl cellosolve and ethyl cellosolve; ester-based solvents such as methyl acetate, ethyl acetate, butyl acetate, methyl propionate, and butyl formate; halogenated hydrocarbons such as trichloroethylene, dichloroethylene, chlorobenzene, and chloroform; etc. These good solvents can be used singly or in a combination of two or more. From the viewpoint of liquid state and storage stability of the adhesive composition, a mixed solvent of an alcohol-based solvent and at least one solvent selected from the group consisting of aromatic hydrocarbons, aliphatic hydrocarbons, and alicyclic hydrocarbons is preferable.

Organic Solvent (D)

The organic solvent (D) used in the present invention may be a good solvent used for the production of the polyolefin modified with a nitrogen-containing heterocyclic compound (C), or may be separately added after separation of the polyolefin modified with a nitrogen-containing heterocyclic compound (C). In the present invention, by dissolving or dispersing the polyolefin modified with a nitrogen-containing heterocyclic compound (C) in an organic solvent of a specific composition, an adhesive composition with good storage stability can be obtained without increasing the viscosity over time.

Examples of the organic solvent (D) are not particularly limited. Usable examples include aromatic hydrocarbons such as benzene, toluene, and xylene; aliphatic hydrocarbons such as hexane, heptane, octane, and deccan; alicyclic hydrocarbons such as cyclohexane, cyclohexene, methylcyclohexane, and ethylcyclohexane; alcohol-based solvents such as methanol, ethanol, isopropyl alcohol, butanol, pentanol, hexanol, propanediol, and phenol; ketone-based solvents such as acetone, methyl isobutyl ketone, methyl ethyl ketone pentanone, hexanone, cyclohexanone, isophorone, and acetophenone; cellosolves such as methyl cellosolve and ethyl cellosolve; ester-based solvents such as methyl acetate, ethyl acetate, butyl acetate, methyl propionate, and butyl formate; halogenated hydrocarbons such as trichloroethylene, dichloro ethylene, chlorobenzene, and chloroform; etc. These solvents can be used singly or in a combination of two or more.

From the viewpoint of liquid state and storage stability of the adhesive composition, the organic solvent (D) is preferably a mixture of at least one solvent (D1) selected from the group consisting of aromatic hydrocarbons, aliphatic hydrocarbons, alicyclic hydrocarbons, and halogenated hydrocarbons and at least one solvent (D2) selected from the group consisting of alcohol-based solvents, ketone-based solvents, and ester-based solvents. The mixing ratio (D1)/(D2) is preferably 60 to 98/40 to 2 (mass ratio), more preferably 65 to 95/35 to 5 (mass ratio), and even more preferably 70 to 90/30 to 10 (mass ratio). When the mixing ratio is outside the above range, the liquid state and storage stability of the adhesive composition may sometimes be reduced.

Composition of Polyolefin Modified with Nitrogen-Containing Heterocyclic Compound The composition of the polyolefin modified with a nitrogen-containing heterocyclic compound of the present invention is a mixture of the polyolefin modified with a nitrogen-containing heterocyclic compound (C) and the organic solvent (D). The polyolefin modified with a nitrogen-containing heterocyclic compound (C) may be dissolved or dispersed in the organic solvent (D). From the viewpoint of storage stability, the polyolefin modified with a nitrogen-containing heterocyclic compound (C) is preferably dissolved.

The amount of the organic solvent (D) is preferably 100 to 1,000 parts by mass, more preferably 200 to 800 parts by mass, and even more preferably 300 to 500 parts by mass per 100 parts by mass of the polyolefin modified with a nitrogen-containing heterocyclic compound (C). When the amount of the organic solvent is less than 100 parts by mass, the organic solvent (D) may not be dissolved in the polyolefin modified with a nitrogen-containing heterocyclic compound (C), and the storage stability may be reduced. When the amount of the organic solvent (D) exceeds 1,000 parts by mass, the productivity may become poor because of excess dilution.

Adhesive Composition

The adhesive composition of the present invention can be used as a resin as is without dissolving or dispersing the polyolefin modified with a nitrogen-containing heterocyclic compound (C) in a solvent or the like, or can be used as the composition of a polyolefin modified with a nitrogen-containing heterocyclic compound by dissolving or dispersing the polyolefin (C) in the solvent, etc. From the viewpoint of operability, etc., the polyolefin modified with a nitrogen-containing heterocyclic compound (C) is preferably dissolved or dispersed. Examples of the solvent include water and the organic solvent (D).

The adhesive composition of the present invention can be used by adding various additives other than the solvent as long as the properties of the present invention are not impaired. The additives are not particularly limited; however, flame retardants, pigments, anti-blocking agents, etc., can be preferably used.

The present invention is explained in detail below with reference to the Examples. However, the present invention is not limited to these Examples. The term "parts" in the Examples and Comparative Examples means "parts by mass."

Production Example 1

A propylene butene copolymer (Tafmar (trademark) XM7070 produced by Mitsui Chemicals, Inc.) (100 parts by mass), toluene (150 parts by mass), and maleic anhydride (20 parts by mass) were added to an autoclave (1 L), and the mixture was heated to 130° C. to homogeneously dissolve the propylene butene copolymer. Di-tert-butyl peroxide (4 parts by mass) was added to the propylene butene copolymer solution heated to 130° C., and the mixture was stirred at 140° C. for three hours. After cooling, the resulting reaction solution was poured into a container containing a large amount of methyl ethyl ketone to precipitate a resin. Subsequently, the resin-containing liquid was centrifuged to perform solid-liquid separation of the (poly)maleic anhydride and a low-molecular weight compound as well as the modified propylene butene copolymer to which the maleic anhydride was graft-polymerized, followed by purification. Thereafter, a maleic-anhydride-modified propylene butene copolymer (PO-1, acid addition amount: 2.0 mass %) was obtained by drying the resultant under reduced pressure at 70° C. for five hours.

Production Example 2

A propylene butene copolymer (Tafmar (trademark) XM7070 produced by Mitsui Chemicals, Inc.) (100 parts by mass), toluene (150 parts by mass), and maleic anhydride (13 parts by mass) were added to an autoclave (1 L), and the mixture was heated to 110° C. to homogeneously dissolve the propylene butene copolymer. Tert-butyl peroxy benzoate (4 parts by mass) was added to the propylene butene copolymer solution heated to 120° C., and the mixture was stirred at 120° C. for three hours. Thereafter, the same procedure as in Production Example 1 was performed to obtain a maleic-anhydride-modified propylene butene copolymer (PO-2, acid addition amount: 1.8 mass %).

Production Example 3

A propylene butene copolymer (Tafmar (trademark) XM7070 produced by Mitsui Chemicals, Inc.) (100 parts by mass), toluene (150 parts by mass), and maleic anhydride (11 parts by mass) were added to an autoclave (1 L). The same procedure as in Production Example 1 was performed to obtain a maleic-anhydride-modified propylene butene copolymer (PO-3, acid addition amount: 0.8 mass %).

Production Example 4

A propylene ethylene copolymer (Licocene PP1602 produced by Clariant Japan) (100 parts by mass), toluene (150 parts by mass), and maleic anhydride (20 parts by mass) were added to an autoclave (1 L). The same procedure as in Production Example 2 was performed to obtain a maleic-anhydride-modified propylene ethylene copolymer (PO-4, acid addition amount: 3.0 mass %).

Production Example 5

A propylene butene copolymer (Tafmar (trademark) XM7070 produced by Mitsui Chemicals, Inc.) (100 parts by mass), toluene (150 parts by mass), and maleic anhydride (1 part by mass) were added to an autoclave (1 L). The same procedure as in Production Example 1 was performed to obtain a maleic-anhydride-modified propylene butene copolymer (PO-5, acid addition amount: 0.3 mass %).

Example 1

PO-1 (100 parts by mass) obtained in Production Example 1, Reverlink (trademark) U (3 parts by mass), toluene (360 parts by mass), and 1-butanol (40 parts by mass) were introduced into a four-necked flask (500 mL) equipped with a water-cooled reflux condenser and a stirrer. By increasing the temperature to reflux (about 100° C.) while stirring, materials were homogeneously dissolved. Reaction was then conducted for three hours under reflux (about 100° C.). Thereafter, the resultant was cooled to around the room temperature, and an adhesive composition containing imidazolidinone modified polyolefin was obtained. The modification amount was 2.6 mass %. Table 1 shows the composition and properties.

TABLE 1

|  |  | Example |  |  |  |  |  | Comparative Example |  |  |  |  |  |
|---|---|---|---|---|---|---|---|---|---|---|---|---|---|
|  |  | 1 | 2 | 3 | 4 | 5 | 6 | 1 | 2 | 3 | 4 | 5 | 6 |
| Acid-modified polyolefin (A) | PO-1 | 100 |  |  |  |  | 100 | 100 | 100 | 100 |  | 100 | 100 |
|  | PO-2 |  | 100 |  |  |  |  |  |  |  |  |  |  |
|  | PO-3 |  |  | 100 |  |  |  |  |  |  |  |  |  |
|  | PO-4 |  |  |  | 100 |  |  |  |  |  |  |  |  |
|  | PO-5 |  |  |  |  | 100 |  |  |  |  |  |  |  |
|  | Licocene PP1602 |  |  |  |  |  |  |  |  |  | 100 |  |  |
| Nitrogen-containing heterocyclic compound (B) | Reverlink U | 3 | 3 | 1.5 | 4.5 | 3 |  |  |  |  |  | 3 | 3 |
|  | 1-(2-hydroxyethyl)-2-imidazolidinone |  |  |  |  |  | 3 |  |  |  |  |  |  |
| Organic solvent (D) | Toluene | 360 | 360 | 360 | 360 | 360 | 360 | 360 | 360 | 360 | 360 | 400 | 160 |
|  | 1-Butanol | 40 | 40 | 40 | 40 | 40 | 40 | 40 | 40 | 40 | 40 | 0 | 240 |
| Silane coupling agent | KBM-403 |  |  |  |  |  |  |  | 3 |  |  |  |  |
|  | KBM-903 |  |  |  |  |  |  |  |  | 1 |  |  |  |
|  | KBM-603 |  |  |  |  |  |  |  |  | 2 |  |  |  |
| Liquid state |  | B | B | B | B | B | B | B | B | C | B | C | B |
| Storage stability |  | A | A | A | A | A | A | A | C | — | A | — | C |
| Nitrogen-containing heterocyclic compound modification amount mass % |  | 2.6 | 2.4 | 1.1 | 3.9 | 0.4 | 2.6 | — | — | — | — | — | 2.6 |
| PP/glass tensilon shear strength | Initial 80° C. calcination MPa | 3.1 | 3.3 | 3.0 | 4.2 | 1.8 | 3.0 | 1.6 | 2.1 | — | 0.5 | — | 3.1 |
|  | After moisture test 80° C. calcination MPa | 3.9 | 4.1 | 3.2 | 4.4 | 1.0 | 3.5 | 0.7 | 2.2 | — | 0.5 | — | 3.9 |

Examples 2 to 6

Except for the compositions of materials introduced, adhesive compositions were obtained in the same manner as in Example 1. Table 1 shows the compositions and properties.

Comparative Examples 1 to 6

Materials shown in Table 1 were introduced into a four-necked flask (500 mL) equipped with a water-cooled reflux condenser and a stirrer. By increasing the temperature to reflux (about 100° C.) while stirring, materials were homogeneously dissolved. Subsequently, the resultant was cooled to around the room temperature, and a modified polyolefin solution was obtained. Thereafter, a silane coupling agent shown in Table 1 was added to the solution before the adhesion test described below to obtain an adhesive composition.

The nitrogen-containing heterocyclic compound and the silane coupling agent used in Table 1 are as follows.
Nitrogen-containing heterocyclic compound: 1-(2-aminoethyl)-2-imidazolidinone, Reverlink (trademark) U produced by Arkema; Epoxy-based silane coupling agent: 3-glycidoxypropyltrimethoxysilane, KBM-403 produced by Shin-Etsu Chemical Co., Ltd.;
Amino-based silane coupling agent: 3-Aminopropyl trimethoxysilane, KBM-903 produced by Shin-Etsu Chemical Co., Ltd.; and
Amino-based silane coupling agent: N-2-(Aminoethyl)-3-aminopropyl trimethoxysilane, KBM-603 produced by Shin-Etsu Chemical Co., Ltd.

Table 2 shows the FT-IR measurement results of imidazolidinone modified polyolefin (Example 1) and acid-modified polyolefin (Comparative Example 1).

The acid-modified polyolefin (Comparative Example 1) containing no imidazolidinone derivative showed an absorption peak at 1780 cm$^{-1}$, which is specific to an acid anhydride group, and did not show absorption peaks at 1640 cm$^{-1}$ or 1720 cm$^{-1}$, which are in the zone relating to the C=O double bond specific to imidazolidinone and amide. In contrast, the imidazolidinone modified polyolefin (Example 1) showed no peak at 1780 cm$^{-1}$, but showed absorption peaks at 1640 cm$^{-1}$ and 1720 cm$^{-1}$, which are related to the C=O double bond specific to imidazolidinone and amide.

The peak in the zone related to the acid anhydride of the acid-modified polyolefin decreased, and the peak in the zone specific to the imidazolidinone unit appeared. This proved that the imidazolidinone compound was bound to the acid-modified polyolefin via an amide linkage.

TABLE 2

|  |  | Example 1 Imidazolidinone modified polyolefin | Comparative Example 1 Acid-modified polyolefin |
|---|---|---|---|
| 1780 cm$^{-1}$ | Acid anhydride group C=O stretching | Absent | Present |
| 1640 cm$^{-1}$ | Second amide C=O stretching | Present | Absent |
| 1720 cm$^{-1}$ | Carbonyl C=O stretching | Present | Absent |

Liquid State

The liquid state immediately after the production of adhesive compositions obtained in the Examples and Comparative Examples was visually observed and evaluated. The adhesive composition that had fluidity and was easy to remove from the flask was evaluated as B, and the adhesive composition that had no fluidity and was difficult to remove from the flask was evaluated as C.

Storage Stability

The thickening and gelation of the adhesive compositions obtained in the Examples and Comparative Examples under 25° C. atmosphere over time were visually observed and evaluated. Adhesive compositions with poor stability, i.e., thickening and gelation were visually observed in 24 hours were evaluated as C, adhesive compositions in which poor stability was not visually observed when 24 hours had passed, but was visually observed when 720 hours had passed, were evaluated as B, and adhesive compositions in which poor stability was not visually observed when 720 hours had passed were evaluated as A. The storage stability test was not performed for the adhesive compositions that were evaluated as C in the liquid test.

Initial Adhesion Test

Each of the adhesive compositions obtained in the Examples and Comparative Examples was applied to the surface of a PP plate and the surface of a glass plate (both produced by Nippon Test Panel Co., Ltd., length×width×thickness=100 mm×25 mm×2 mm), both of which had been purified with an alcohol-based solvent, followed by drying. The resulting plates were then adhered by thermocompression.

More specifically, each adhesive composition was applied using a material that had been diluted with toluene to have a resin concentration of 12 mass %. After application, preliminary drying was performed at room temperature for two minutes and then at 80° C. for 10 minutes. After drying, the applied surfaces were brought into contact at an area of 25 mm×10 mm, and thermal compression was performed at 80° C., 0/1 MPa, for 60 s using a TP-701-B heat seal tester produced by Tester Sangyo Co., Ltd.

After the adhesive plate was cured for 12 hours, a tensilon test was performed at a tensilon speed of 50 mm/min using an RTM-100 tensilon produced by Orientec Co., Ltd. to evaluate the tensilon shear strength.

Adhesion Test after Moisture Resistance Test (Moisture Resistant Adhesion)

Each of the adhesive plates obtained in the same manner as in the initial adhesion test was placed at 80° C. and a humidity of 90% RH for 168 hours to perform a moisture resistance test. Thereafter, a tensilon test was performed in the same manner as in the initial adhesion test to evaluate the tension shear strength.

INDUSTRIAL APPLICABILITY

The polyolefin modified with a nitrogen-containing heterocyclic compound of the present invention is a novel modified polyolefin containing no harmful halogen atoms such as chlorine. Since the adhesive composition containing the polyolefin modified with a nitrogen-containing heterocyclic compound does not need to use a silane coupling agent, and has sufficient adhesion strength between a polyolefin substrate and an inorganic substrate such as a glass substrate, it is particularly preferably used for applications such as automobile parts used in harsh environments.

The invention claimed is:

1. A polyolefin modified with a nitrogen-containing heterocyclic compound (C) having a nitrogen-containing heterocyclic compound (B) at a side chain of an acid-modified polyolefin (A), wherein the amount of the nitrogen-containing heterocyclic compound (B) is 3.9 to 7 mass %.

2. The polyolefin modified with a nitrogen-containing heterocyclic compound (C) according to claim 1, wherein the nitrogen-containing heterocyclic compound (B) is a cyclic alkylene urea derivative.

3. The polyolefin modified with a nitrogen-containing heterocyclic compound (C) according to claim 1, wherein the nitrogen-containing heterocyclic compound (B) is an imidazolidinone derivative and/or a tetrahydropyrimidinone derivative represented by formula (1) below,

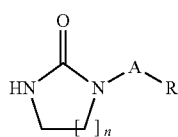

wherein n is an integer of 1 or 2, A is a $C_{1-20}$ alkylene group that may have at least one substituent, and R is an amino group, a hydroxy group, a thiol group, an isocyanate group, or an epoxy group.

4. The polyolefin modified with a nitrogen-containing heterocyclic compound (C) according to claim 1, wherein the nitrogen-containing heterocyclic compound (B) is 1-(2-aminoethyl)-2-imidazolidinone.

5. The polyolefin modified with a nitrogen-containing heterocyclic compound (C) according to claim 1, wherein the acid-modified polyolefin (A) is a maleic-anhydride-modified polypropylene and/or a maleic-anhydride-modified propylene α-olefin copolymer.

6. A composition of a polyolefin modified with a nitrogen-containing heterocyclic compound containing the polyolefin modified with a nitrogen-containing heterocyclic compound (C) according to claim 1 and an organic solvent (D).

7. The composition according to claim 6, wherein the organic solvent (D) is contained in an amount of 100 to 1000 parts by mass per 100 parts by mass of the polyolefin modified with a nitrogen-containing heterocyclic compound (C).

8. An adhesive composition comprising the polyolefin modified with a nitrogen-containing heterocyclic compound (C) according to claim 1.

9. A laminate wherein a polyolefin substrate is adhered to an inorganic substrate by the adhesive composition according to claim 8.

10. An adhesive composition comprising the composition of a polyolefin modified with a nitrogen-containing heterocyclic compound according to claim 6.

11. A laminate wherein a polyolefin substrate is adhered to an inorganic substrate by the adhesive composition according to claim 10.

12. A composition of a polyolefin modified with a nitrogen-containing heterocyclic compound containing:
a polyolefin modified with a nitrogen-containing heterocyclic compound (C) having a nitrogen-containing heterocyclic compound (B) at a side chain of an acid-modified polyolefin (A),
wherein the amount of nitrogen-containing heterocyclic compound (B) is 3.9 to 7 mass %; and
an organic solvent (D), wherein
the organic solvent (D) is a mixture of a solvent (D1) and a solvent (D2),
the solvent (D1) is at least one solvent selected from the group consisting of aromatic hydrocarbons, aliphatic hydrocarbons, alicyclic hydrocarbons, and halogenated hydrocarbons,
the solvent (D2) is at least one solvent selected from the group consisting of alcohol-based solvents, ketone-based solvents, and ester-based solvents, and
the ratio of the solvent (D1)/solvent (D2) is 60 to 98/40 to 2 (mass ratio).

13. An adhesive composition comprising the composition of a polyolefin modified with a nitrogen-containing heterocyclic compound according to claim 12.

14. A laminate wherein a polyolefin substrate is adhered to an inorganic substrate by the adhesive composition according to claim 13.

* * * * *